US012167206B2

(12) United States Patent
Merca

(10) Patent No.: US 12,167,206 B2
(45) Date of Patent: Dec. 10, 2024

(54) HEARING DEVICE EARPIECE WITH TILTED MICROPHONE/RECEIVER

(71) Applicant: GN Hearing A/S, Ballerup (DK)

(72) Inventor: Timea Denisa Merca, Køge (DK)

(73) Assignee: GN HEARING A/S, Ballerup (DK)

( * ) Notice: Subject to any disclaimer, the term of this patent is extended or adjusted under 35 U.S.C. 154(b) by 68 days.

(21) Appl. No.: 17/528,738

(22) Filed: Nov. 17, 2021

(65) Prior Publication Data

US 2022/0174438 A1 Jun. 2, 2022

(30) Foreign Application Priority Data

Nov. 30, 2020 (DK) ............................ PA202070803

(51) Int. Cl.
*H04R 25/00* (2006.01)

(52) U.S. Cl.
CPC .................................... *H04R 25/65* (2013.01)

(58) Field of Classification Search
CPC ...................................................... H04R 25/65
USPC .......................................................... 381/328
See application file for complete search history.

(56) References Cited

U.S. PATENT DOCUMENTS 6,748,093 B2 6/2004 Tøpholm
9,338,539 B2 5/2016 Chen
10,455,311 B2 10/2019 Magariyachi et al.
11,540,041 B2 12/2022 Kuipers et al.
2001/0043707 A1 11/2001 Leedom
2002/0136421 A1 9/2002 Topholm
2009/0074220 A1 3/2009 Shennib
2015/0350762 A1 12/2015 Birger et al.
2016/0014493 A1 1/2016 Chen
2017/0164121 A1 6/2017 Herscher et al.
2017/0195766 A1 7/2017 Magariyachi et al.
(Continued)

FOREIGN PATENT DOCUMENTS

EP 2849461 3/2015
EP 2947898 11/2015
EP 3334179 6/2018
(Continued)

OTHER PUBLICATIONS

WO 2009/23738. Text version (Year: 2009).*
(Continued)

*Primary Examiner* — Phylesha Dabney
(74) *Attorney, Agent, or Firm* — Vista IP Law Group, LLP

(57) ABSTRACT

An earpiece for a hearing device for insertion into an ear canal of a user and having a longitudinal axis is disclosed. The earpiece comprises an earpiece housing having a distal end, a proximal end, and an outer surface connecting the distal end to the proximal end. The earpiece housing having a sound outlet at the proximal end and a microphone inlet. The earpiece comprises a receiver for providing an audio output signal to an ear canal when the earpiece is inserted into the ear canal. The receiver has a receiver axis being a longitudinal center axis. The earpiece comprises a microphone for provision of a first microphone input signal. The microphone comprises a microphone membrane, wherein the microphone has a microphone axis forming a normal to the microphone membrane. The receiver axis and the microphone axis form a first angle, wherein the first angle is larger than 5 degrees.

17 Claims, 10 Drawing Sheets

(56) References Cited

U.S. PATENT DOCUMENTS

| | | | |
|---|---|---|---|
| 2020/0288251 | A1 | 9/2020 | Kuipers |

FOREIGN PATENT DOCUMENTS

| | | | | |
|---|---|---|---|---|
| EP | 3471437 | | 4/2019 | |
| WO | WO 2007/038712 | | 4/2007 | |
| WO | WO-2009023738 | A2 * | 2/2009 | ............. H04R 25/02 |
| WO | WO 2013/091724 | | 6/2013 | |

OTHER PUBLICATIONS

Extended European Search Report for EP Patent Appln. No. 21208722.5 dated Apr. 22, 2022.
Foreign 1st Technical Examination Report for Danish Patent Appln. No. PA 2020 70803 dated Feb. 11, 2021.
Foreign 2nd Technical Examination Report for Danish Patent Appln. No. PA 2020 70803 dated Sep. 1, 2021.

* cited by examiner

HEARING DEVICE EARPIECE WITH TILTED MICROPHONE/RECEIVER

RELATED APPLICATION DATA

This application claims priority to, and the benefit of, Danish Patent Application No. PA 2020 70803 filed on Nov. 30, 2020. The entire disclosure of the above application is expressly incorporated by reference here.

FIELD

The present disclosure relates to a hearing device earpiece with a tilted microphone/receiver.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, the earpiece is connected to the external device by a cable comprising one or more wires and/or a sound guiding channel.

Earpieces for hearing devices are typically worn for many hours and therefore wearing comfort is of key importance for a hearing device user.

SUMMARY

Accordingly, there is a need for earpieces for hearing devices where the earpiece does not put strain on the ear of the user and improves the wearing comfort for the user.

An earpiece for a hearing device for insertion into an ear canal of a user and having a longitudinal axis is disclosed. The earpiece comprises an earpiece housing having a distal end, a proximal end, and an outer surface connecting the distal end to the proximal end. The earpiece housing has a sound outlet at the proximal end and optionally a microphone inlet. The earpiece comprises a receiver for providing an audio output signal to the ear canal when the earpiece is inserted into the ear canal. The receiver has a receiver axis, e.g., being a longitudinal center axis. The earpiece optionally comprises a microphone for provision of a first microphone input signal. The microphone comprises a microphone membrane, wherein the microphone has a microphone axis forming a normal to the microphone membrane. The receiver axis and the microphone axis optionally form a first angle, wherein the first angle is larger than 5 degrees.

Also, a hearing device comprising an earpiece as described herein is provided.

It is an important advantage of the hearing device that a size of the earpiece can be reduced thereby increasing the wearing comfort to a user. By placing the microphone such that the receiver axis and the microphone axis form a first angle larger than 5 degrees to the receiver, the dimensions of the earpiece may be reduced. This can allow for ease of fit with a user. This also allows for an improved form factor of the earpiece which can increase the wearing comfort to a user of the earpiece. Previous hearing device solutions may not fit properly in small ear canals, or may extend too far outwards from the ear canal to make it comfortable for the user to wear. Further, the present disclosure allows for the microphone inlet to the arranged in the earpiece housing for optimal sound reception. In one or more variations of the disclosed hearing device, the device may be more accommodating to those users with smaller ear canals.

The present disclosure allows for improved sound quality of the hearing device. By placing the microphone such that the receiver axis and the microphone axis form a first angle larger than 5 degrees to the receiver, the microphone inlet may be directed away from the skin of the ear of a user of the hearing device, which may otherwise distort the incoming sound, and directed in the direction of an incoming sound wave reaching the ear of the user.

Thus, the earpiece of the present disclosure allows for improved sizing, improved comfort to a user, and improved sound quality.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
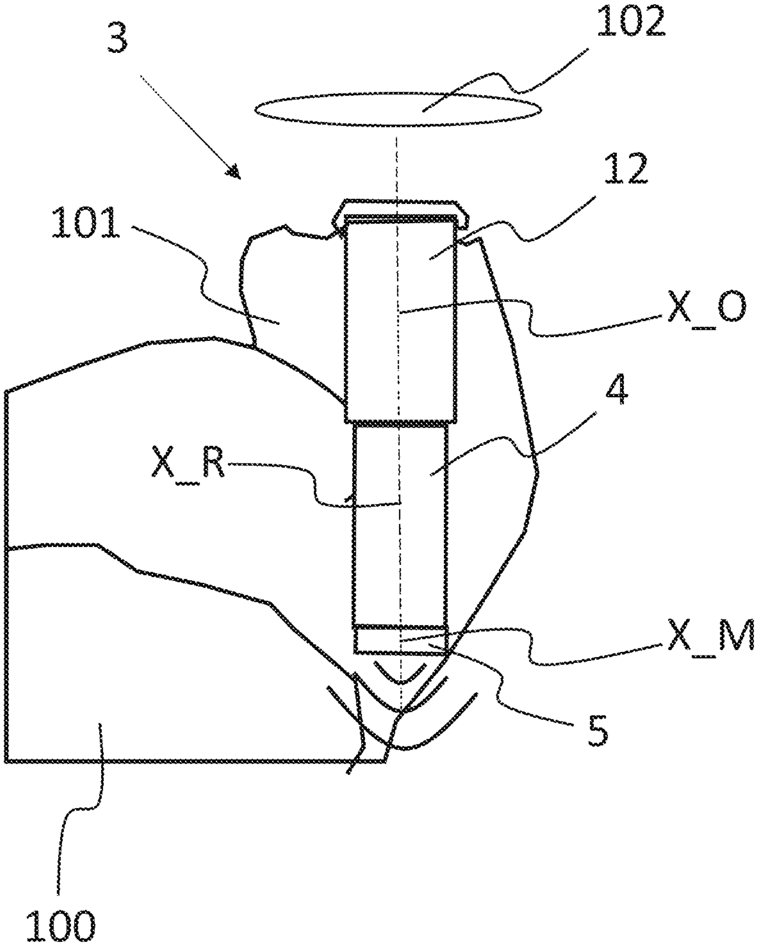
FIG. 1 schematically illustrates an exemplary known earpiece for a hearing device, FIG. 2-6 schematically illustrate internal positioning of components of exemplary earpieces according to the disclosure, FIG. 7 schematically illustrates an exemplary earpiece housing according to the disclosure, FIG. 8A-8B schematically illustrates an exemplary earpiece according to the disclosure, and FIG. 9 schematically illustrates an exemplary earpiece according to the disclosure arranged in an ear of a user.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

An earpiece for a hearing device is disclosed. The hearing device may be configured to be worn at an ear of a user and may be a hearable or a hearing aid, wherein a processor of the hearing aid is configured to compensate for a hearing loss of a user. The hearing device may be of the behind-the-ear (BTE) type, in-the-ear (ITE) type, in-the-canal (ITC) type, receiver-in-canal (RIC) type, receiver-in-the-ear (RITE) type, and/or microphone-and-receiver-in-ear (MaRie) type. The hearing device may be a behind-the-ear (BTE) and microphone-and-receiver-in-ear (MaRie) hearing device.

The earpiece is configured for insertion into an ear canal of a user and has a longitudinal axis. The earpiece comprises an earpiece housing having a distal end, a proximal end, and an outer surface connecting the distal end to the proximal end. The proximal end can herein be seen as the end closest to an ear drum of the user when the earpiece is inserted into the ear of the user. The distal end of the earpiece can herein be seen as the end furthest away from an ear drum of the user when the earpiece is inserted into the ear of the user. The outer surface of the earpiece housing may at least partly define a first volume inside the earpiece housing. The earpiece housing may comprise a first and a second earpiece housing part, such as a distal earpiece housing part and a proximal earpiece housing part.

As discussed herein, the terms proximal or proximally can herein be seen as a side, a surface, end, or part closest to an ear drum of the user when the earpiece is inserted into the ear of the user or a side, a surface, end, or part intended to be arranged closest to an ear drum of the user when the earpiece is inserted into the ear of the user. The terms distal or distally can herein be seen as a side, a surface, end, or part furthest away from an ear drum of the user when the earpiece is inserted into the ear of the user or a side, a surface, end, or part intended to be arranged furthest away from an ear drum of the user when the earpiece is inserted into the ear of the user.

The earpiece housing has a sound outlet at the proximal end and a microphone inlet. The sound outlet and the microphone inlet can be seen as openings in the earpiece housing having an area. The earpiece comprises a receiver for providing an audio output signal to an ear canal when the earpiece is inserted into the ear canal. The receiver has a receiver axis being a longitudinal center axis, such as a longitudinal center axis of the receiver. The receiver may comprise a receiver membrane. The receiver axis may be perpendicular to a normal of the receiver membrane. The earpiece comprises a microphone for provision of a first microphone input signal. The microphone comprises a microphone membrane. The microphone membrane optionally is in fluid communication with the microphone inlet. The microphone has a microphone axis forming a normal to the microphone membrane. The receiver axis and the microphone axis optionally form a first angle, such as a first angle to each other. The first angle may be larger than 5 degrees. In other words, the microphone may be tilted in relation to the receiver. By arranging the microphone axis and the receiver axis at the first angle larger than 5 degrees to each other, the orientation of the microphone may be configured to follow the shape of the human ear when inserted into the ear of a user. The microphone may for example be arranged to be directed away from the outer ear of the user when the earpiece is inserted into the ear of the user, such as away from the tragus of the ear of the user. The microphone may be arranged so that the microphone axis, e.g. through the microphone inlet, has a clear line of sight out of the ear of the user and is not directed towards any part of the ear of the user.

The sound outlet may be configured to direct the sound from the receiver towards the ear drum of the user when the earpiece is arranged in the ear canal of the user. The sound outlet may be defined as a cross section of a proximal end of the earpiece housing, such as an end (proximal end) of a first proximal part of the earpiece housing. The proximal part of the earpiece housing may have a cylindrical shape. The proximal part of the earpiece housing may herein also be referred to as a nozzle. In one or more example earpieces, the earpiece housing, such as the proximal part of the earpiece housing, may be configured to receive a dome, such as a flexible dome, for securing the earpiece in or to the ear canal of the user. The earpiece housing, such as the proximal part of the earpiece housing, may comprise a flange for securing the dome to the earpiece housing. The sound outlet and/or the proximal part of the earpiece housing may in one or more example earpieces be configured to hold a filter device for preventing cerumen from entering the sound outlet and the sound tube. Thereby, the sound tube may be prevented from clogging up, which could otherwise cause a degradation of the sound quality and subsequently a malfunction of the hearing device. The microphone inlet may comprise one or more apertures in the earpiece housing allowing sound waves to enter and/or leave the earpiece housing. In one or more example earpieces, the microphone is at least partly arranged between a distal end of the receiver and a proximal end of the receiver along the receiver axis. In other words, the microphone may extend at least partially along the receiver axis outside the receiver housing.

The microphone may in one or more example earpieces at least partly overlap with the receiver in the longitudinal direction of the receiver and/or along the longitudinal axis of the earpiece. By arranging the microphone to at least partly overlap with the receiver in the longitudinal direction and/or along the longitudinal axis of the earpiece, the longitudinal extension of the earpiece may be reduced. In other words, the size of the earpiece in the longitudinal direction of the earpiece may be reduced. In one or more exemplary earpieces, a distal end of the microphone and/or a proximal end of the microphone may be arranged distal to the receiver. In one or more exemplary earpieces, a proximal end of the microphone may be arranged proximal to the distal end of the receiver. In one or more exemplary earpieces, a distal end of the microphone may be arranged proximal to the distal end of the receiver. In one or more exemplary earpieces, the microphone may be offset from the receiver axis, such as in a direction perpendicular to the receiver axis. By offsetting the microphone from the receiver axis, the microphone may be moved closer to the receiver in the longitudinal direction of the receiver, since a proximal end of the microphone may be positioned to overlap with the distal end of the receiver. In one or more example earpieces, the proximal end of the microphone may be arranged between the proximal end and the distal end of the receiver in the longitudinal direction of the earpiece, while the distal end of the microphone is arranged distal to the distal end of the receiver. In one or more example earpieces, the proximal end of the microphone and the distal end of the microphone may be arranged between the proximal end and the distal end of the receiver in the longitudinal direction of the receiver. By placing the microphone so that it at least partly overlaps with the receiver in the longitudinal direction of the earpiece, the longitudinal extension of the earpiece can be reduced. The longitudinal extension of the earpiece can herein be seen as the size of the earpiece in the longitudinal direction of the earpiece. In one or more example earpieces, the first angle is in a range from 10 to 85 degrees or in a range from 5 to 10 degrees. In one or more example earpieces, the first angle may be larger than 85 degrees. In one or more example earpieces, the microphone axis is perpendicular to the receiver axis. In one or more exemplary earpieces, the first angle is in the range from 1 degree to 5 degrees. The first angle may be less than 5 degrees, such as less than 1 degree.

In one or more exemplary earpieces/microphones, the microphone has a microphone port arranged in an outer surface of the microphone. The microphone port can be seen as an opening in the microphone element, the opening having an area. The microphone port is configured to allow sound waves to enter the microphone and to reach the microphone membrane arranged inside the microphone. In one or more exemplary microphones, the microphone port is arranged in an outer surface parallel to the microphone membrane, such as perpendicular to the microphone axis.

Sound waves may thus enter the microphone parallel to the microphone axis. The microphone port may have a microphone port axis perpendicular to the area of the microphone port, such as to the plane defined by the area of the microphone port. When the microphone port is arranged in the outer surface of the microphone being parallel to the microphone membrane, the microphone port axis may be parallel to the microphone axis, e.g., coaxial with the microphone axis.

In one or more exemplary earpieces/microphones, the microphone port is arranged in an outer surface of the microphone being perpendicular to the microphone membrane, such as being parallel to the microphone axis. In other words, a plane defined by the area of the microphone port is perpendicular to the microphone membrane, such as parallel to the microphone axis. In one or more exemplary microphones, the microphone port is arranged in a distal outer surface being perpendicular to the microphone membrane. The distal outer surface being perpendicular to the microphone membrane may be smaller such as have a smaller surface area, than the outer surface being parallel to the microphone membrane. In other words, the microphone port may be arranged on a thin side of the microphone element, such as on one of the sides parallel to the microphone axis. The microphone port may have a microphone port axis perpendicular to the area of the microphone port, such as to the plane defined by the area of the microphone port. When the microphone port is arranged in the outer surface of the microphone being perpendicular to the microphone membrane, the microphone port axis may be perpendicular to the microphone axis.

In one or more example earpieces, the earpiece housing has an outlet axis perpendicular to the sound outlet. The outlet axis may be arranged at a second angle to the receiver axis of the receiver. The second angle may be larger than 5 degrees. The second angle may be less than 75 degrees. The second angle may for example be in a range of 8 to 75 degrees. In one or more example earpieces, the second angle is less than 75 degrees, such as less than 45 degrees, or even less than 30 degrees. By arranging the outlet axis at a second angle to the receiver axis, the receiver can be arranged to follow the shape of the ear canal of the user, while the sound outlet can be directed towards the ear drum of the user, when the earpiece is positioned in the ear of the user. In one or more exemplary earpieces, the second angle is in the range from 1 degree to 5 degrees. The second angle may be less than 5 degrees, such as less than 1 degree.

In one or more example earpieces, the first angle and/or the second angle may be selected so that the microphone port axis is directed away from the outer ear of the user such as away from the tragus of the ear of the user. The first angle and/or the second angle may be selected so that the microphone port axis has a clear line of sight out of the ear of the user, such as along the external auditory canal, and is not directed towards any part of the ear of the user.

In one or more example earpieces, the receiver comprises a receiver outlet arranged at a proximal end of the receiver. In one or more example earpieces, the earpiece comprises a sound tube for guiding sound from the receiver outlet, such as from a spout of the receiver, towards the sound outlet of the earpiece. The sound tube may be arranged at a third angle to the receiver axis, the third angle being larger than 5 degrees. The third angle may be less than the second angle. In one or more exemplary earpieces, the third angle is in the range from 1 degree to 5 degrees. The third angle may be less than 5 degrees, such as less than 1 degree. By arranging the sound tube at a third angle to the receiver axis, the receiver can be arranged to follow the shape of the ear canal of the user, while the sound tube can be directed towards the ear drum of the user, when the earpiece is positioned in the ear of the user. Thus, the comfort of wear and the sound quality experienced by the user of the earpiece can be improved. In one or more example earpieces, the second angle is equal to the third angle, such that the sound tube extends in parallel to the outlet axis of the earpiece.

The receiver outlet may have a center being offset from the receiver axis. By offsetting the center of the receiver outlet from the receiver axis, the sound tube connected to the receiver outlet can be arranged centered in the sound outlet of the earpiece, when the sound tube is arranged at the third angle to the receiver axis. The offset of the center of the receiver outlet from the receiver axis may be determined based on the second angle between the output axis and the receiver axis and a relative position between the receiver and the sound outlet, such that the offset receiver outlet is located on the outlet axis.

In one or more example earpieces, the earpiece housing has a cable outlet and the microphone inlet. The cable outlet may in one or more example earpieces be distal to the microphone inlet. In other words, the cable outlet may be arranged further away from the ear drum of the user than the microphone inlet when the earpiece housing is mounted to an earpiece and the earpiece is inserted into the ear of the user. In one or more example earpieces, the cable outlet has a cable axis perpendicular to the cable outlet. The cable axis and the receiver axis may form a fourth angle. The fourth angle may be larger than 10 degrees. In one or more example earpieces, the earpiece comprises a cable extending from the earpiece housing. The cable may be configured for connection to a secondary housing, such as a BTE housing, of the hearing device. The cable may extend through the cable outlet for connecting the microphone and the receiver comprised within the earpiece housing with a secondary housing of the hearing device. In one or more example earpieces, the fourth angle is in the range of 45 to 90 degrees. The earpiece housing may further comprise a strain relief device arranged in the cable outlet, for absorbing forces acting on the cable.

In one or more example earpieces, the earpiece comprises a dome, such as a flexible dome, for securing the earpiece in the ear canal. The dome may extend circumferentially along the outer surface of the earpiece housing. The dome may have an inner surface extending circumferentially along the outer surface of the earpiece housing and an outer surface configured to abut the inside of the ear canal of the user. The dome may be formed as a plug or shell manufactured to fit snugly in the ear canal of the user, e.g., by manufacturing the dome according to an impression made of the ear canal or by manufacturing the dome as a generically shaped dome made from a resilient material, e.g., a silicone-based elastomeric material. The dome may be made from a plastic material with a smooth outer surface for comfort, stability, and hygienic reasons. In one or more example earpieces, the dome has a vent aperture through the dome for provision of fluid communication between a proximal side and a distal side of the dome.

In one or more example earpieces, the earpiece comprises a vent mechanism arranged in the earpiece housing. The vent mechanism may be arranged proximal or distal to the receiver. The vent mechanism may be an active vent mechanism. The vent mechanism may be configured to open and close a vent path inside the earpiece housing. The vent path can pass at least partially through the earpiece housing. The vent mechanism can include any mechanical mechanism that opens and closes a vent path. In one or more exemplary earpieces, the vent mechanism may be operated electronically and/or automatically and/or manually and/or mechanically. The opening and closing of the vent mechanism may not be audible to the user. In one or more example earpieces, the vent path has a first set of first vent apertures comprising a first primary vent aperture on the proximal end of the earpiece housing. The vent path may extend through the earpiece housing, such as from a proximal end of the earpiece housing to a distal end of the earpiece housing. The vent path may have a second set of second vent apertures comprising a second primary vent aperture on the outer surface distal to the vent mechanism.

When the vent mechanism is open, the vent mechanism allows air to flow through the earpiece between a proximal end and a distal end of the earpiece. When closed, the vent mechanism prevents air from flowing through the vent path in the earpiece, e.g., between a proximal end and a distal end of the earpiece and/or between a distal side and a proximal side of the vent mechanism. Thus, the vent mechanism can prevent fluid communication when closed. This can advantageously allow for improved sound quality when a user is for example listening to music. For example, the vent mechanism can be closed so that a user can experience improved bass hearing.

However, when the user desires to hear the surrounding environment, the vent mechanism can be opened to avoid undesired occlusion effects. Thus, the vent mechanism can enable fluid communication when open.

For example, in one or more exemplary earpieces, instead of having the vent path pass through the proximal end of the earpiece housing, the first set of first vent apertures may be located in a different place on the receiver housing. For example, the first set of first vent apertures can be in the outer surface of the earpiece housing. When the first set of first vent apertures are arranged in the outer surface of the earpiece housing, the vent apertures arranged in the dome can allow air to flow from the proximal side of the dome to the distal side of the dome from where it may enter the earpiece housing through the first set of first vent apertures in the outer surface of the earpiece housing.

The first primary vent aperture may in one or more example earpieces be proximal to the vent mechanism. In one or more exemplary earpieces, the first set of first vent apertures are located distal to the receiver. In one or more exemplary earpieces, the first set of first vent apertures are located proximal to the receiver. In one or more exemplary earpieces, the first set of first vent apertures are aligned with the receiver. In one or more exemplary earpieces, some of the first set of first vent apertures are proximal to the receiver and some are aligned with the receiver. In one or more exemplary earpieces, some of the first set of first vent apertures are proximal to the receiver and some are distal to the receiver. In one or more exemplary earpieces, some of the first set of first vent apertures are distal to the receiver and some are aligned with the receiver. In one or more exemplary earpieces, some of the first set of first vent apertures are proximal to the receiver, some are aligned with the receiver, and some are distal to the receiver.

In one or more exemplary earpieces, the outer surface includes one or more first primary vent aperture(s). For example, a plurality of first primary vent apertures may be spaced along an outer circumference of the outer surface. The outer surface can include multiple circumferential rows of the first primary vent apertures, with each row being longitudinally spaced apart. The first primary vent apertures may be randomly spaced on the outer surface.

In one or more exemplary earpieces, the first set of first apertures can include a primary vent aperture on the proximal end of the earpiece housing and on the outer surface. Thus, air can enter/exit the earpiece housing from multiple directions proximal to the vent mechanism.

Similar to above, the vent path can include a second set of second vent apertures, e.g., in the outer surface of the earpiece housing. Thus, the second set of second vent apertures can provide fluid communication (e.g., a vent path) between outside the earpiece housing and inside the earpiece housing. The second set of second vent apertures can include a second primary vent aperture. The second primary vent aperture may be distal to the vent mechanism. The second primary vent aperture may be circular and/or ovaloid.

The second primary vent aperture may be on the outer surface of the earpiece housing. In one or more exemplary earpieces, the outer surface can include one second primary vent aperture. In alternative earpieces, the outer surface can include a plurality of second primary vent apertures. For example, a plurality of second primary vent apertures may be spaced along an outer circumference of the outer surface. The outer surface can include multiple circumferential rows of the secondary primary vent apertures, with each row being longitudinally spaced apart. The secondary primary vent apertures may be randomly spaced on the outer surface.

In one or more exemplary earpieces, the second set of second vent apertures can be located on the distal end, such as on a distal part, of the earpiece housing. In one or more exemplary earpieces, the distal end can include one second primary vent aperture. In alternative earpieces, the distal end can include a plurality of second primary vent apertures.

In one or more exemplary earpieces, the second set of second vent apertures can be on the outer surface and the distal end. Thus, air can enter/exit the earpiece housing from multiple directions distal to the vent mechanism.

The hearing device may be configured for wireless communication with one or more devices, such as with another hearing device, e.g., as part of a binaural hearing system, and/or with one or more accessory devices, such as a smartphone and/or a smart watch. The hearing device optionally comprises an antenna for converting one or more wireless input signals, e.g., a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g., as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device optionally comprises a pre-processing unit. The pre-processing unit may be connected to the radio transceiver for pre-processing the transceiver input signal. The pre-processing unit may be connected to the first microphone for pre-processing the first microphone input signal. The pre-processing unit may be connected to the second microphone if present for pre-processing the second microphone input signal. The pre-processing unit may comprise one or more A/D-converters for converting analog microphone input signal(s) to digital pre-processed microphone input signal(s).

The hearing device comprises a processor for processing input signals, such as pre-processed transceiver input signal and/or pre-processed microphone input signal(s). The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a processor for processing input signals, such as pre-processed transceiver input signal(s) and/or pre-processed microphone input signal(s). The processor is optionally configured to compensate for hearing loss of a user of the hearing device. The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

FIG. 1 shows an earpiece 3 for a hearing device. The earpiece 3 is in FIG. 1 illustrated when arranged in an ear canal 101 of an ear 100 of a user of the earpiece 3. The exemplary earpiece shown in FIG. 1 comprises a receiver 4 having a receiver axis X_R, a microphone 5 having a microphone axis X_M and a sound outlet 12 having an outlet axis X_O. The receiver 4, the microphone 5 and the sound outlet 12 are arranged such that the receiver axis X_R, the microphone axis X_M and the outlet axis X_O form a common axis. In other words, the angle between the receiver axis X_R, the microphone axis X_M and the outlet axis X_O is 0 degrees. The receiver 4, the microphone 5 and the sound outlet 12 are arranged in series with the sound outlet 12 being arranged proximal to the receiver 4, such that a proximal end of the receiver 4 is arranged distal to the distal end of the sound outlet 12. The receiver 4 is in turn arranged proximal to the microphone 5, such that a proximal end of the microphone 5 is arranged distal to the distal end of the receiver 4. Proximal herein means closest to the ear drum 102 of the user when the earpiece 3 is inserted into the ear 100 of the user. Distal herein means furthest away from the ear drum 102 when the earpiece is inserted into the ear 100 of the user. Due to the serial arrangement of the components of the earpiece 3, such as of the receiver 4, the microphone 5 and the sound outlet 12, the size of the earpiece 3 in the longitudinal direction, such as along the common axis formed by the receiver axis X_R, the microphone axis X_M and the outlet axis X_O, is relatively long. The earpiece 3 may thus extend too far outwards from the ear canal 101 to make it comfortable for the user to wear. The distal end of the earpiece 3, such as the microphone 5 and/or a distal end of the earpiece housing (not shown in FIG. 1), may contact and press against the outer parts of the ear 100 of the user. This may cause pain to the user wearing the earpiece. Furthermore, since the microphone is directed towards the outer parts of the ear 100 of the user, the sound quality may be reduced since sound waves reaching the ear 100 may be distorted by the ear 100 before they reach the microphone 5.

Figure 2:
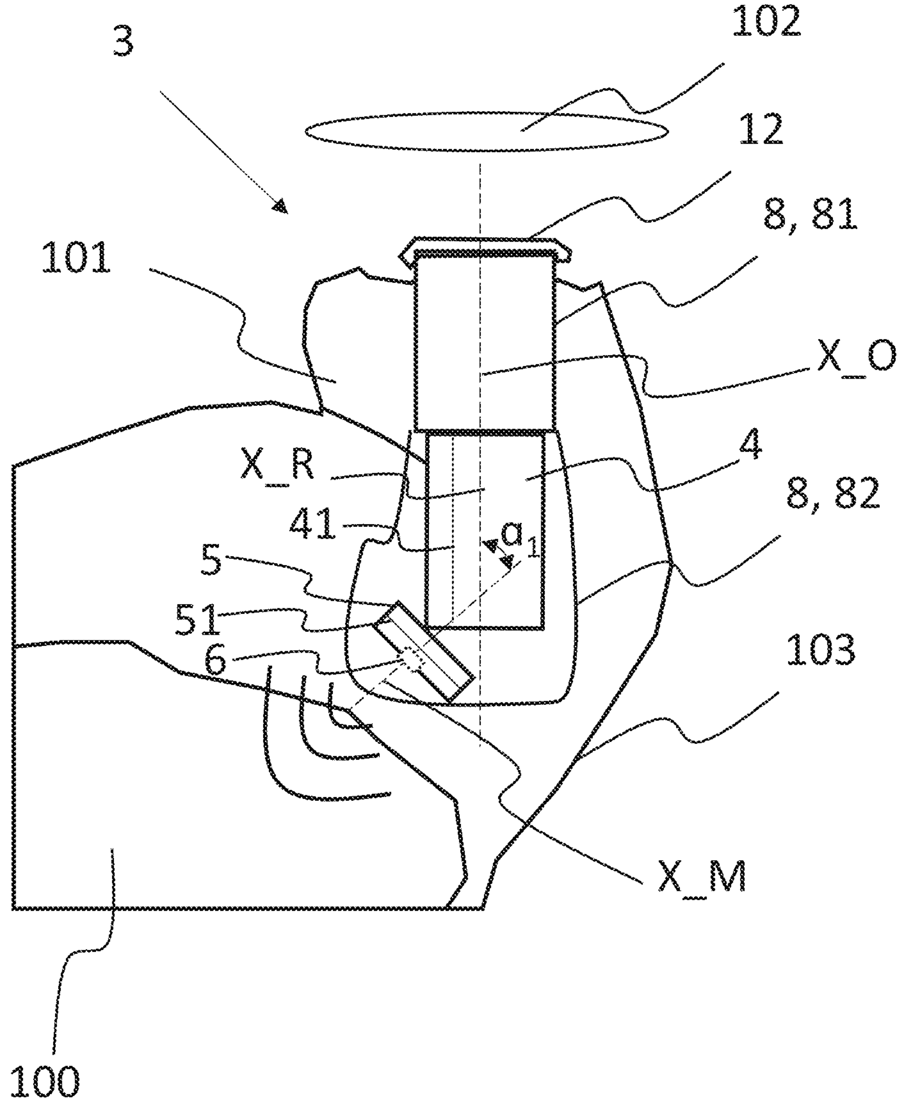

FIG. 2 shows an exemplary earpiece 3 for a hearing device according to the current disclosure. The earpiece 3 is configured for insertion into the ear canal 101 of a user and has a longitudinal axis. The earpiece 3 comprises an earpiece housing 8, the earpiece housing 8 comprising a first earpiece housing part 81 and a second earpiece housing part 82. The earpiece 3 comprises a receiver for providing an audio output signal to an ear canal when the earpiece is inserted into the ear canal. The receiver has a receiver axis X_R. The receiver axis X_R may be a longitudinal center axis, such as a longitudinal center axis of the receiver 4. The receiver 4 may comprise a receiver membrane 41, wherein the receiver membrane has a normal perpendicular to the receiver axis X_R. The earpiece 3 comprises a microphone 5 for provision of a first microphone input signal. The microphone 5 comprises a microphone membrane 51. The microphone 5 has a microphone axis X_M forming a normal to the microphone membrane 51. The receiver axis X_R and the microphone axis X_M form a first angle $\alpha_1$, such as a first angle $\alpha_1$ to each other. The first angle $\alpha_1$ is larger than 5 degrees. In other words, the microphone 5 may be tilted in relation to the receiver 4. By arranging the microphone axis X_M and the receiver axis X_R at the first angle $\alpha_1$ to each other, the orientation of the microphone 5 may be configured to follow the shape of the human ear when inserted into the ear 100 of a user.

The exemplary microphone 5 shown in FIG. 2 is arranged to be directed away from the outer parts of the ear of the user when the earpiece is inserted into the ear of the user, such as away from the tragus 103 of the ear 100 of the user. The microphone 5 may be arranged so that the microphone axis has a clear line of sight out of the ear 100 of the user, such as along the external auditory canal, and is not directed towards any part of the ear 100 of the user. Thereby, incoming sound waves may reach the microphone 5 in the direction of the microphone axis X_M which can improve the quality of the input signal provisioned by the microphone 5. The earpiece 3 further comprises a sound outlet 12 having an outlet axis X_O. The sound outlet 12 is arranged at a proximal end of the receiver 4. In the exemplary earpiece shown in FIG. 2, the sound outlet is arranged such that the receiver axis X_R and the outlet axis X_O form a common axis.

In the exemplary earpiece of FIG. 2, the microphone 5 is offset from the receiver axis X_R in a direction perpendicular to the receiver axis X_R. By offsetting the microphone 5 from the receiver axis X_R, the microphone 5 may be moved closer to the receiver 4 in the longitudinal direction of the receiver 4, such that the microphone 5 may be positioned to overlap with the receiver 4. The microphone 5 is partly arranged between a distal end of the receiver 4 and a proximal end of the receiver 4 in the longitudinal direction of the receiver 4, such as in a direction parallel to the receiver axis X_R. The microphone 5 partly overlaps with the receiver 4 in the longitudinal direction of the receiver 4. In other words, the proximal end of the microphone 5 is arranged proximal to the distal end of the receiver 4, such as between the proximal end and the distal end of the receiver 4, while the distal end of the microphone 5 is arranged distal to the distal end of the receiver 4. By arranging the microphone to partly overlap with the receiver in the longitudinal direction, the longitudinal extension of the earpiece may be reduced compared to earpieces where the receiver 4 and the microphone 5 are arranged in series. Thereby, the size of the earpiece 3 in the longitudinal direction of the earpiece 3 may be reduced. The exemplary microphone 5 shown in FIG. 2 has a microphone port 6 arranged in an outer surface of the microphone 5, wherein the outer surface is parallel to the microphone membrane 51, such as perpendicular to the microphone axis X_M. The microphone port 6 can be seen as an opening in the microphone element 5, the opening having an area. The microphone port 6 is configured to allow sound waves to enter the microphone 5 and to reach the microphone membrane 51 arranged inside the microphone 5. The microphone port 6 may have a microphone port axis X_MP, the microphone port axis X_MP being perpendicular to the area of the microphone port 6, such as to the plane defined by the area of the microphone port 6. In the exemplary microphone 5 shown in FIG. 2, the microphone port axis X_MP is parallel to the microphone axis X_M, e.g. coaxial with the microphone axis X_M.

The microphone 5 and the receiver 4 are arranged within the earpiece housing 8, such as within the second earpiece housing part 82. The exemplary earpiece 3 in FIG. 2 is shown without a dome. However, a dome may be arranged on the proximal end of the earpiece 3, such as on the proximal end of the earpiece housing 8, such as on the first earpiece housing part 81.

Figure 3:
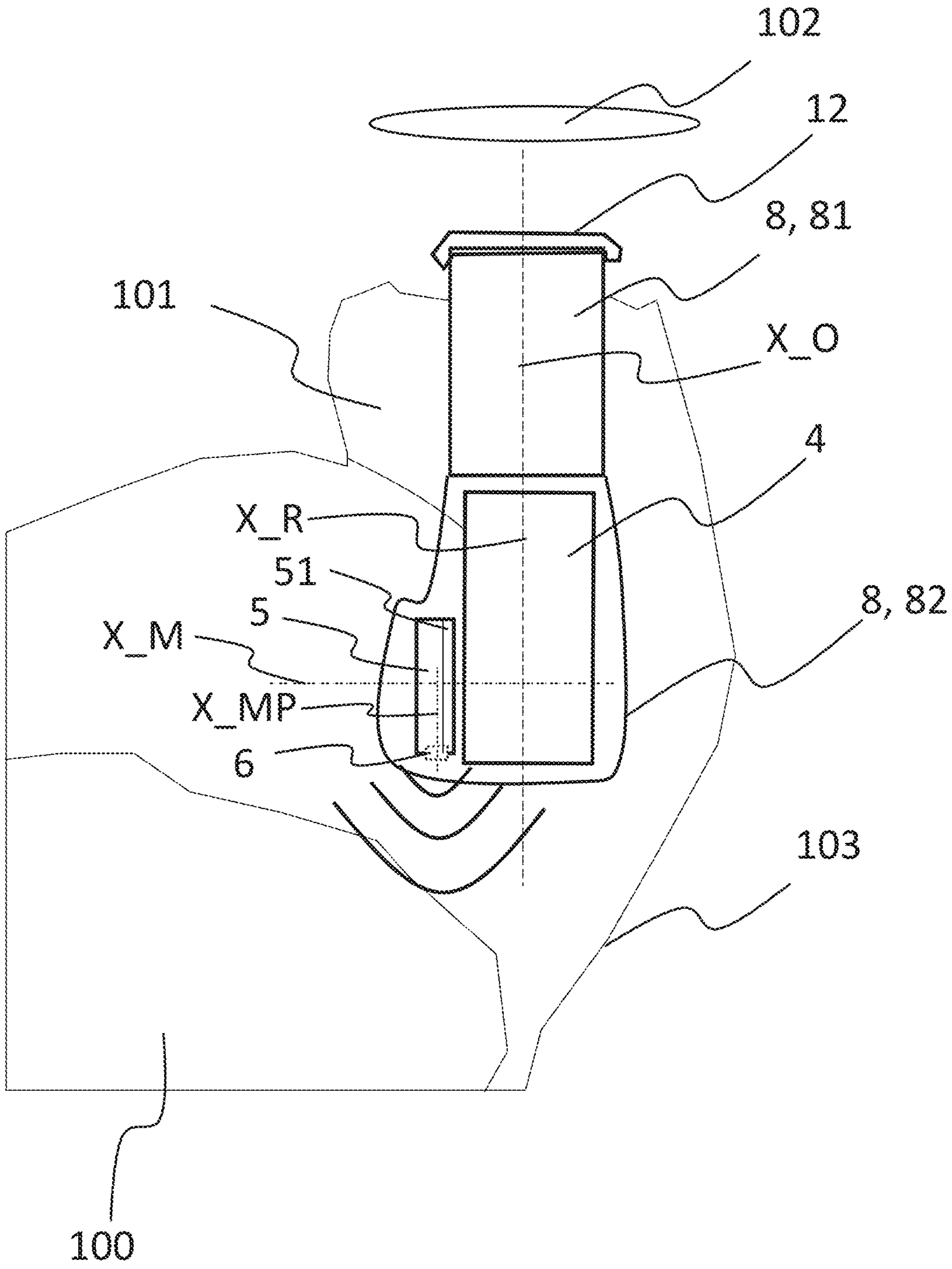

FIG. 3 shows an exemplary earpiece 3 for a hearing device according to the current disclosure. In the exemplary earpiece 3 shown in FIG. 3 the microphone 5 is arranged perpendicular to the receiver 4, such that the microphone axis X_M is perpendicular to the receiver axis X_R. In the exemplary earpiece of FIG. 3 the microphone 5 is offset from the receiver axis by at least the distance from the receiver axis X_R to an outer surface of the receiver 4. This allows the microphone 5 to be arranged in parallel to the receiver 4, such that an outer surface of the microphone is parallel to the outer surface of the receiver 4. In the example shown in FIG. 3, the microphone 5 is arranged such that the proximal end of the microphone 5 and the distal end of the microphone 5 are both arranged between the proximal end and the distal end of the receiver 4 in the longitudinal direction of the receiver. Thereby, the longitudinal extension of the earpiece may be reduced further. Thereby, the size of the earpiece 3 in the longitudinal direction of the earpiece 3 may be reduced while maintaining a compact size of the earpiece 3 in the direction perpendicular to the receiver axis X_R. The exemplary earpiece 3 in FIG. 3 is shown without a dome. However, a dome may be arranged on the proximal end of the earpiece 3, such as on the proximal end of the earpiece housing 8, such as on the first earpiece housing part 81. The exemplary microphone 5 shown in FIG. 3 has the microphone port 6 arranged in an outer surface of the microphone 5, wherein the outer surface is perpendicular to the microphone membrane 51, such as parallel to the microphone axis X_M. The microphone port 6 can be seen as an opening in the microphone element 5, the opening having an area. In other words, a plane defined by the area of the microphone port 6 is perpendicular to the microphone membrane 51, such as parallel to the microphone axis X_M. The microphone port has a microphone port axis X_MP, the microphone port axis X_MP being perpendicular to the area of the microphone port 6, such as to the plane defined by the area of the microphone port 6. The microphone port 6 is configured to allow sound waves to enter the microphone 5 and to reach the microphone membrane 51 arranged inside the microphone 5. In the exemplary microphone shown in FIG. 3, the microphone port 6 is arranged in a distal outer surface perpendicular to the microphone membrane 51. The distal outer surface being perpendicular to the microphone membrane 51 may be smaller such as have a smaller surface area, than the outer surface being parallel to the microphone membrane 51 as shown in FIG. 2. In other words, the microphone port 6 can be arranged on a thin side of the microphone element 5, such as on one of the sides parallel to the microphone axis X_M. In the exemplary microphone 5 shown in FIG. 3, the microphone port axis X_MP is perpendicular to the microphone axis X_M. The first angle $\alpha_1$ and/or the second angle $\alpha_2$ may be selected so that the microphone port axis X_MP is directed away from the outer ear of the user such as away from the tragus 103 of the ear 100 of the user. The first angle $\alpha_1$ and/or the second angle $\alpha_2$ may be selected so that the microphone port axis X_MP has a clear line of sight out of the ear 100 of the user, such as along the external auditory canal, and is not directed towards any part of the ear 100 of the user.

Figure 4:
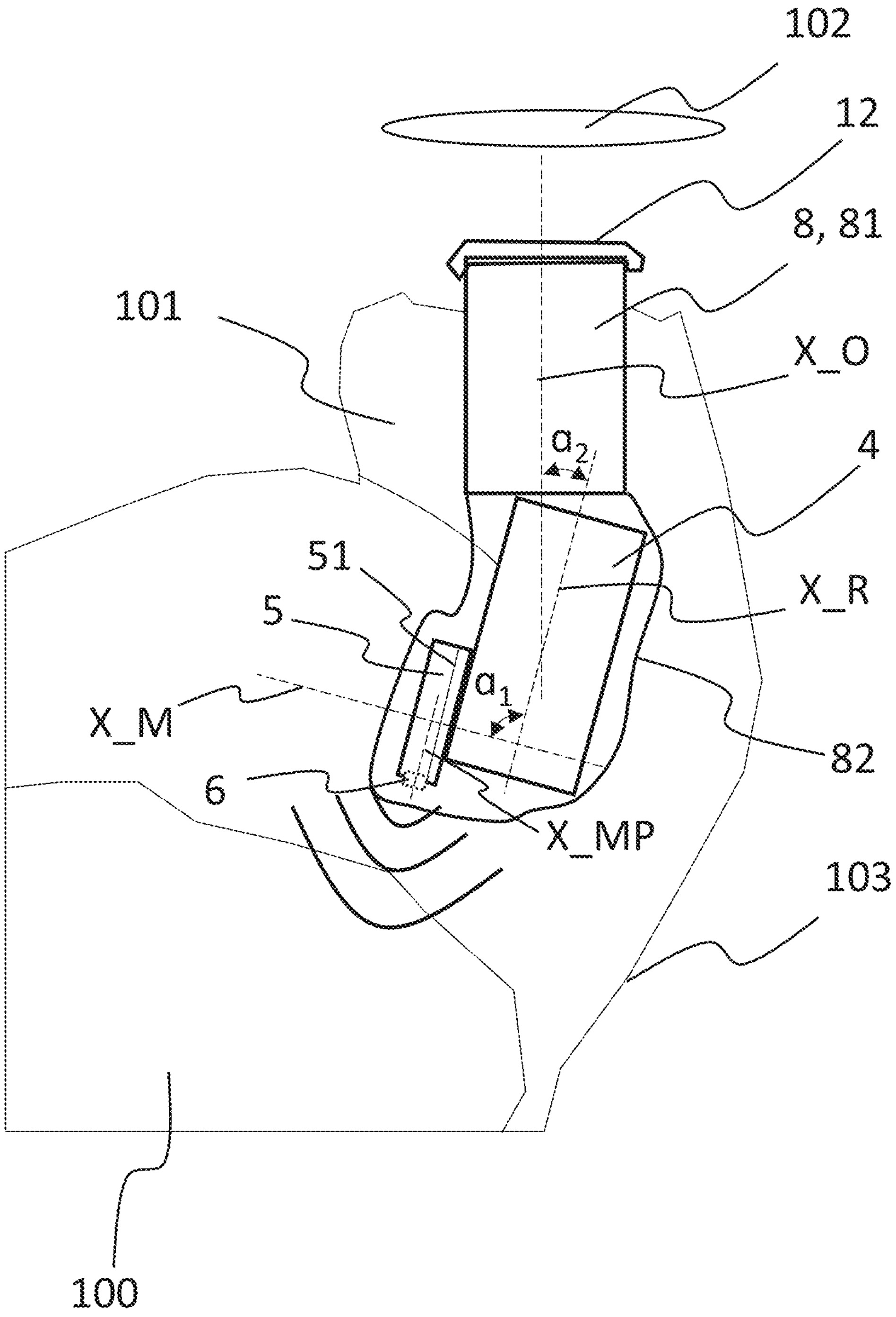

FIG. 4 shows an exemplary earpiece 3 for a hearing device according to the current disclosure. In the exemplary earpiece 3 shown in FIG. 4 the microphone 5 is arranged perpendicular to the receiver 4, such that the microphone axis X_M is perpendicular to the receiver axis X_R. In the exemplary earpiece of FIG. 4 the microphone 5 is offset from the receiver axis by at least the distance from the receiver axis X_R to an outer surface of the receiver 4. This allows the microphone 5 to be arranged in parallel to the receiver 4, such that an outer surface of the microphone is parallel to the outer surface of the receiver 4.

The exemplary earpiece 3 in FIG. 4 is shown without a dome. However, a dome may be arranged on the proximal end of the earpiece 3, such as on the proximal end of the earpiece housing 8, such as on the first earpiece housing part 81. The exemplary microphone 5 shown in FIG. 4 has the microphone port 6 arranged in the outer surface of the microphone 5 being perpendicular to the microphone membrane 51, such as parallel to the microphone axis X_M. In the exemplary microphone 5 shown in FIG. 4, the microphone port 6 is arranged in a distal outer surface of the microphone 5, the distal outer surface of the microphone being perpendicular to the microphone membrane 51. In the example microphone 5 shown in FIG. 4, the distal outer surface perpendicular to the microphone membrane 51 is smaller, such as has a smaller surface area, than the outer surface of the microphone 5 being parallel to the microphone membrane 51. In other words, the microphone port 6 can be arranged on a thin side of the microphone element 5, such as on one of the sides parallel to the microphone axis X_M. In the exemplary microphone 5 shown in FIG. 4, the microphone port axis X_MP is perpendicular to the microphone axis X_M. In the example earpiece 3 shown in FIG. 4, t the second angle $\alpha_2$ can be selected so that the microphone port axis X_MP of the microphone 5 being arranged in parallel to the receiver 4 is directed away from the outer ear of the user such as away from the tragus 103 of the ear 100 of the user. In other words, the receiver 4 may be tilted in relation to the outlet axis X_O by the second angle $\alpha_2$, so that the microphone port axis X_MP of the microphone 5 is directed away from the outer ear of the user such as away from the tragus 103 of the ear 100 of the user. In the example earpiece 3 shown in FIG. 4, the second angle $\alpha_2$ is selected such that the microphone port axis X_MP has a clear line of sight out of the ear 100 of the user, such as along the external auditory canal, and is not directed towards any part of the ear 100 of the user.

Figure 5:
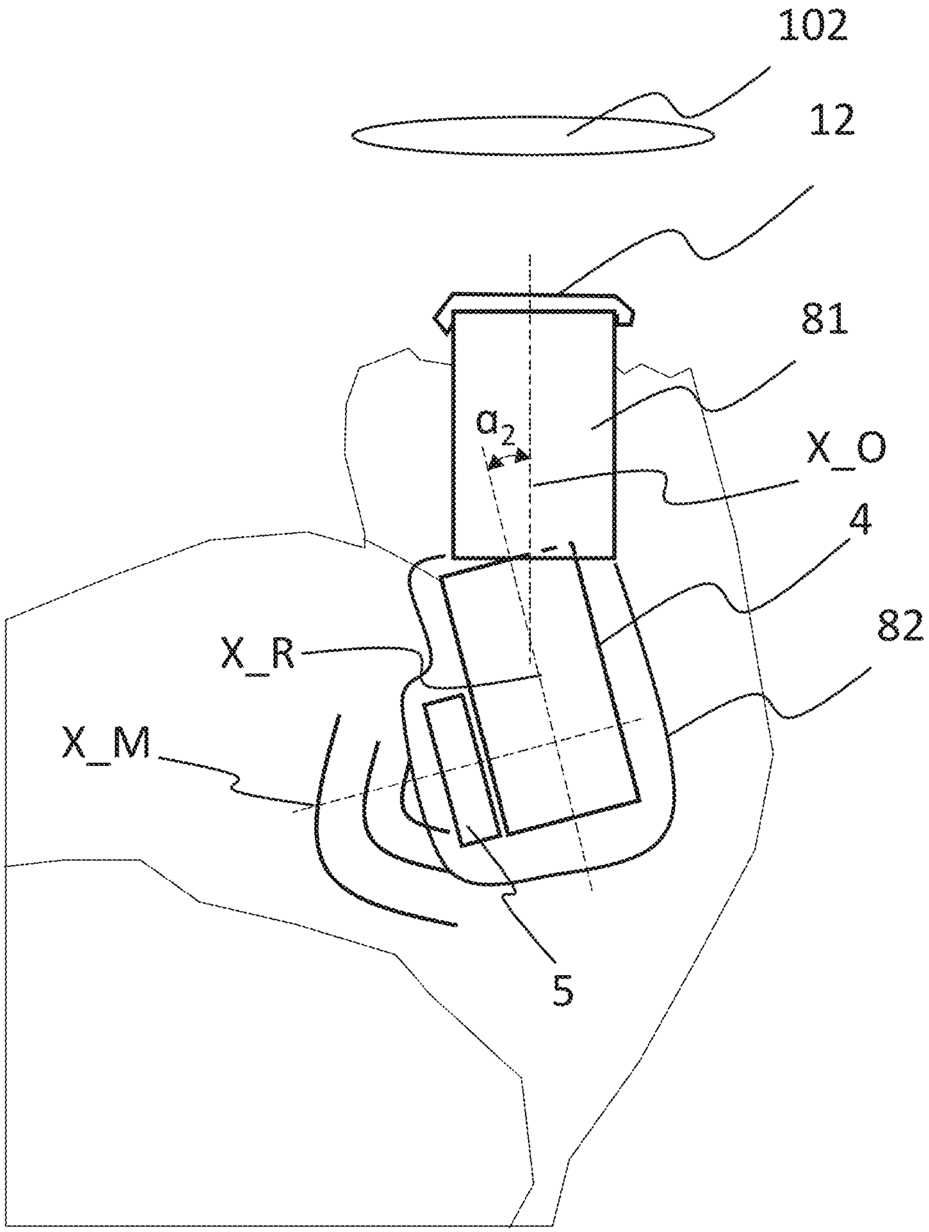

FIG. 5 shows an exemplary earpiece 3 for a hearing device according to the current disclosure. In the example earpiece 3 shown in FIG. 5, the sound outlet 12 may be tilted in relation to the receiver 4, such that the outlet axis X_O is arranged at a second angle $\alpha_2$ to the receiver axis X_R of the receiver 4, wherein the second angle $\alpha_2$ is larger than 5 degrees. The second angle $\alpha_2$ may for example be in a range of 8 to 75 degrees. By arranging the outlet axis X_O at the second angle $\alpha_2$ to the receiver axis X_R, the receiver can be arranged to follow the shape of the ear canal 101 of the user, while the sound outlet 12 can be directed towards the ear drum of the user, when the earpiece 3 is positioned in the ear 100 of the user. The receiver 4 can be arranged to overlap with the proximal part 81 of the receiver housing 8, such that a distal end of the proximal part 81 of the earpiece housing 8 overlaps with a proximal end of the receiver 4. The receiver 4 may thus be partly arranged inside the proximal part 81 of the earpiece housing 8. Thereby, the distance from the distal end of the receiver 4 to the distal end of the proximal part 81 of the earpiece housing 8 may be reduced, which further reduces the size of the earpiece 3. Although the microphone 5 of the exemplary earpiece 3 shown in FIG. 5 is arranged perpendicularly to the receiver 4, the microphone 5 may also be arranged at any first angle to the receiver 4 disclosed herein, such as according to the example earpiece shown in FIG. 2. The exemplary earpiece 3 in FIG. 5 is shown without a dome. However, a dome may be arranged on the proximal end of the earpiece 3, such as on the proximal end of the earpiece housing 8, such as on the first earpiece housing part 81.

Figure 6:
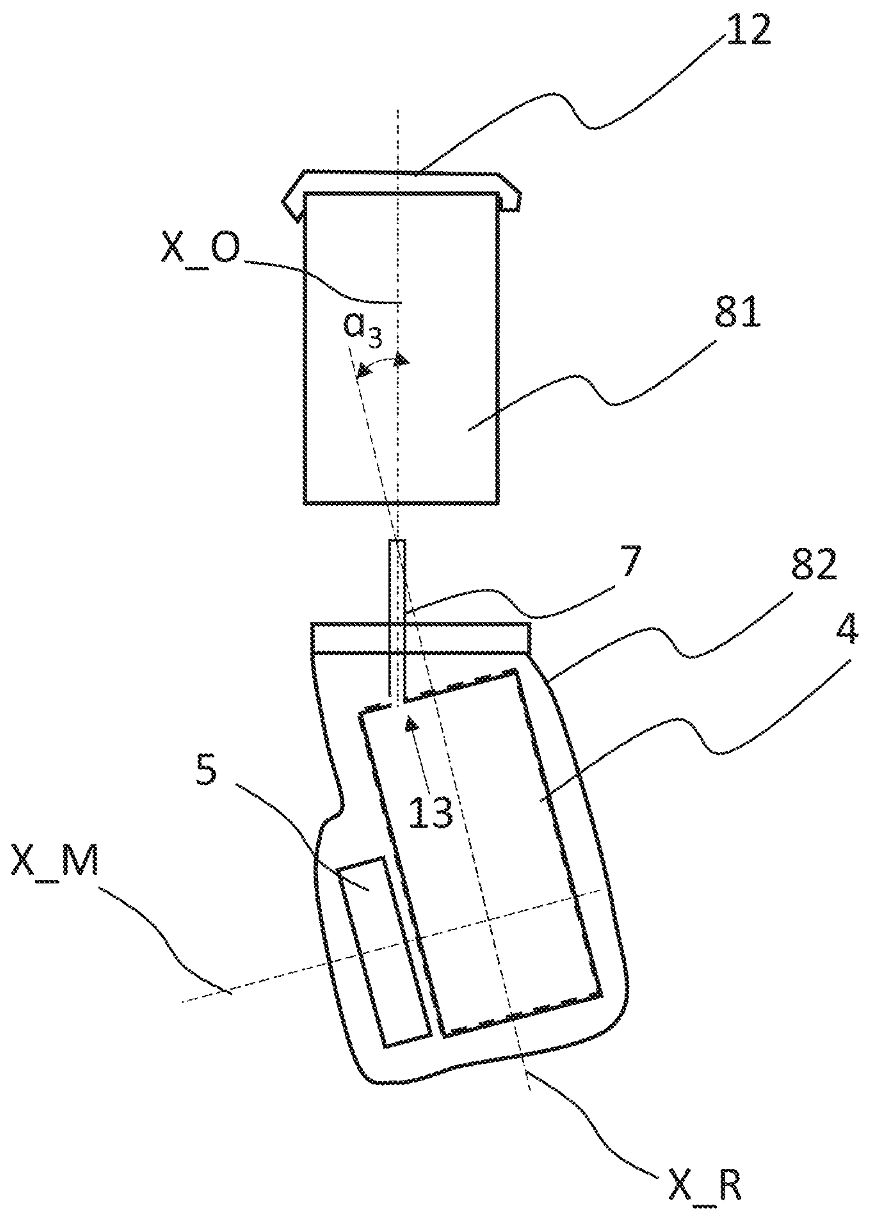

FIG. 6 shows an exploded view of an exemplary earpiece 3 for a hearing device according to the current disclosure. In the exemplary earpiece shown in FIG. 6, the receiver 4 comprises a receiver outlet 13 arranged at the proximal end of the receiver. The earpiece 3 further comprises a sound tube 7 for guiding sound from the receiver outlet 13 towards the sound outlet 12 of the earpiece 3. The sound tube 7 may be arranged at a third angle $\alpha_3$ to the receiver axis X_R, the third angle $\alpha_3$ being larger than 5 degrees. In the example earpiece 3 shown in FIG. 6 the third angle $\alpha_3$ is equal to the second angle $\alpha_2$, such that the sound tube 7 extends in parallel to the outlet axis X_O of the earpiece. By arranging the sound tube 7 at the third angle $\alpha_3$ to the receiver axis X_R, the receiver 4 can be arranged to follow the shape of the ear canal of the user, while the sound tube 7 can be directed towards the ear drum of the user, when the earpiece 3 is positioned in the ear 100 of the user. Thus, the comfort of wear and the sound quality experienced by the user of the earpiece can be improved.

In the example earpiece 3 of FIG. 6, the receiver outlet 13 has a center being offset from the receiver axis X_R. By offsetting the center of the receiver outlet 13 from the receiver axis X_R, the receiver outlet can be arranged centered in the sound outlet 12 of the earpiece 3, such that the offset receiver outlet is located on the outlet axis X_O, when the receiver 4 is arranged at the second angle $\alpha_2$ to the sound outlet 12. Thus, the sound tube 7 connected to the receiver outlet 13 can be arranged centered in the sound outlet 12 of the earpiece 3, such as when the sound tube 7 is arranged at the third angle $\alpha_3$ to the receiver axis X_R. The offset of the center of the receiver outlet from the receiver axis may depend on the second angle and/or third angle. The offset may be dependent on a relative position between the receiver 4 and the sound outlet 12.

In the example earpiece 3 shown in FIG. 6, the microphone 5 is arranged perpendicular to the receiver 4. The microphone 5 is further arranged such that the proximal end of the microphone 5 and the distal end of the microphone 5 are arranged between the proximal end and the distal end of the receiver 4 in the longitudinal direction of the receiver 4. The microphone 5 may however also be arranged at any first angle $\alpha_1$ to the receiver 4 disclosed herein, such as according to the example earpiece shown in FIG. 2. The exemplary earpiece 3 in FIG. 6 is shown without a dome. However, a dome may be arranged on the proximal end of the earpiece 3, such as on the proximal end of the earpiece housing 8, such as on the first earpiece housing part 81.

Figure 7:
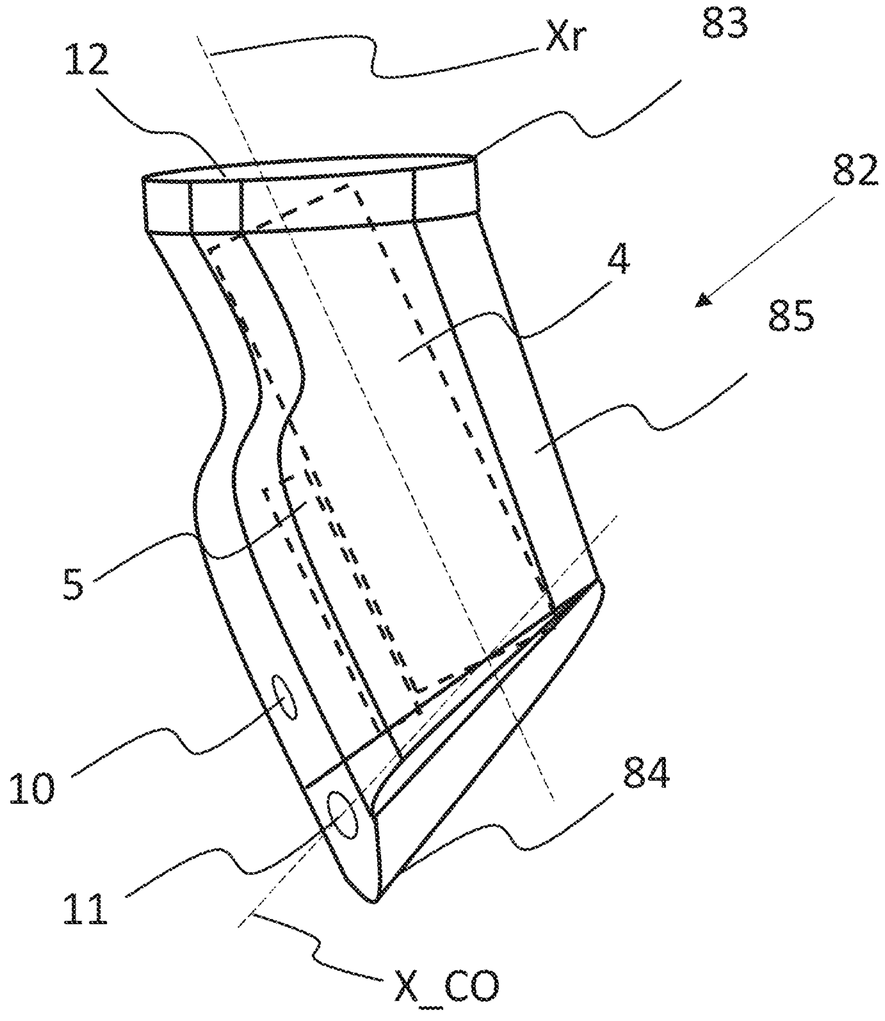

FIG. 7 shows an exemplary distal part 82 of the earpiece housing 8 according to the current disclosure. The distal part 82 of the earpiece housing 8 is arranged further away from the ear drum of the user than the proximal part 81 of the earpiece housing 8 when the earpiece housing 8 is mounted to an earpiece and the earpiece is inserted into the ear of the user. The distal part 82 of the earpiece housing 8 has a proximal end 83, a distal end 84, and an outer surface 85 connecting the proximal end 83 to the distal end 84. The outer surface 85 of the distal part 82 of the earpiece housing 8 may at least partly define a first volume inside the earpiece housing 8. The first volume may be configured to receive for example the microphone 5 and/or the receiver 4. The exemplary distal part 82 of the earpiece housing 8 shown in FIG. 7, has the sound outlet 12 at the proximal end 83 and a microphone inlet 10. The proximal end 83 of the distal part 82 of the earpiece housing 8 may be configured to receive the proximal part 82 of the earpiece housing 8. The exemplary earpiece housing 8, such as the distal part 82 of the earpiece housing 8, has a cable outlet 11 and the microphone inlet 10. The microphone inlet is configured to allow sound waves to enter the earpiece housing 8 and to reach the microphone 5, when the microphone is arranged inside the earpiece housing 8. The cable outlet 11 is arranged distal to the microphone inlet 10. In other words, the cable outlet 11 is arranged further away from the ear drum of the user than the microphone inlet 10 when the earpiece housing 8 is mounted to an earpiece and the earpiece is inserted into the ear of the user. The cable outlet 11 is configured to receive a cable (not shown) extending from the earpiece housing 8 through the cable outlet 11. The cable may be for connecting the receiver 4 and/or the microphone 5 comprised within the earpiece housing 8 to a secondary housing of the hearing device. The cable outlet 11 and the microphone inlet 10 can be seen as openings in the earpiece housing 8 having an area. The cable outlet may have a cable outlet axis X_CO perpendicular to the cable outlet, such as perpendicular to the area or a plane of the cable outlet 11. The cable outlet axis X_CO may correspond to a cable axis of a cable extending through the cable outlet 11. The cable outlet axis X_CO and the receiver axis may form a fourth angle $\alpha_4$, the fourth angle $\alpha_4$ being larger than 10 degrees, such as in the range of 45 to 90 degrees. The fourth angle $\alpha_4$ may be selected so that the cable is directed away from the outer ear of the user when the earpiece is inserted into the ear of the user, such as away from the tragus of the ear of the user. The cable outlet 11 can thus be positioned on the outer surface 85 connecting the proximal end 83 and the distal end 84 of the earpiece housing 8, such that the length of the earpiece housing in a longitudinal direction of the earpiece housing 8 can be further reduced. Thereby, the comfort of wear for the user of the earpiece can be improved since the cable does not come into contact with the ear of the user.

Figure 8A:
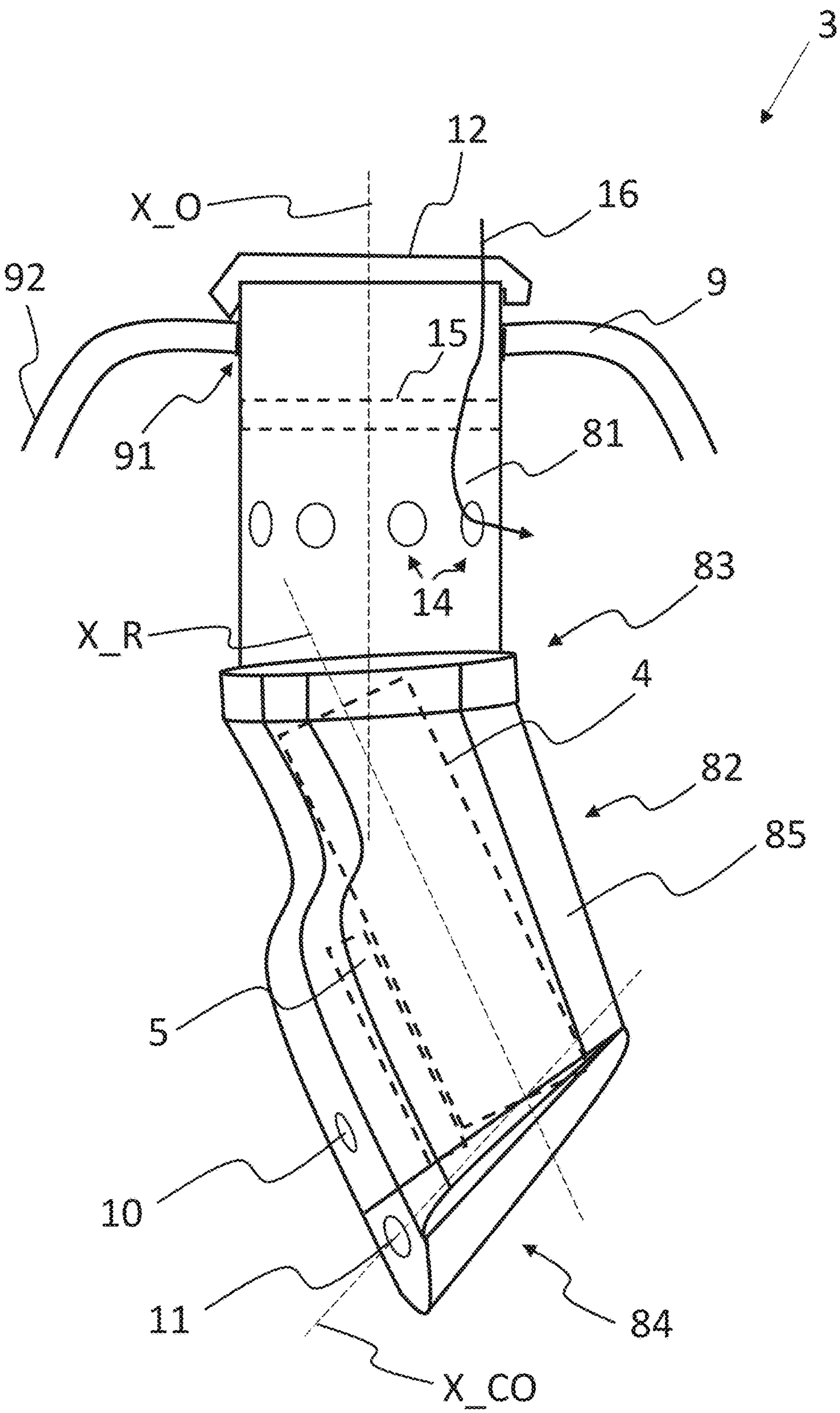
Figure 8B:
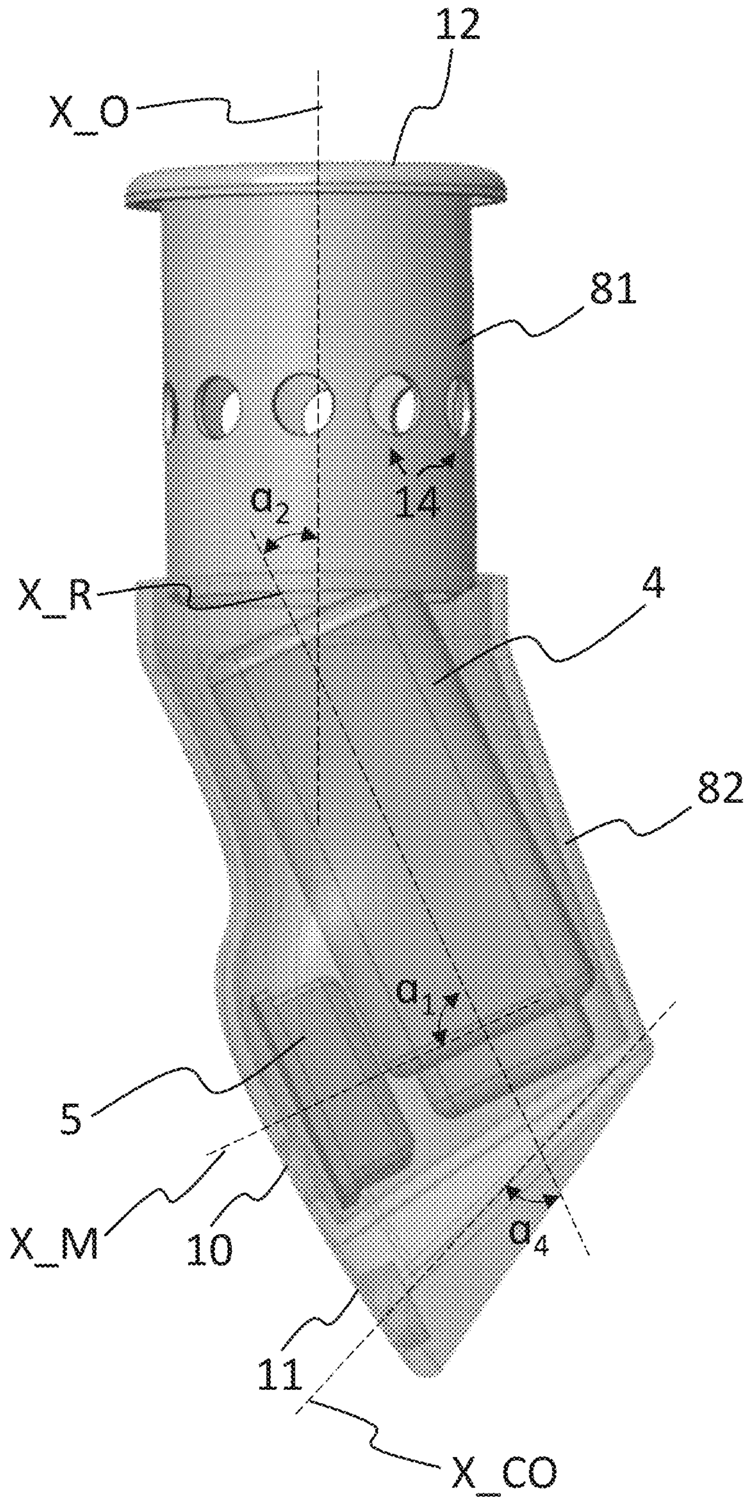

FIGS. 8A and 8B show an exemplary earpiece 3 according to the current disclosure. Unless otherwise noted, the earpiece 3 can include the same features as discussed above with respect to FIGS. 2-7. As shown in FIGS. 8A and 8B, the earpiece 3 comprises an earpiece housing 8, wherein the housing comprises a first earpiece housing part 81, such as a proximal earpiece housing part, and a second earpiece housing part 82, such as a distal earpiece housing part. The earpiece 3 shown in FIG. 8A comprises a dome 9, such as a flexible dome, for securing the earpiece 3 in the ear canal. The dome 9 may extend circumferentially along the outer surface of the earpiece housing 8, such as along the outer surface of the first earpiece housing part 81. The dome 9 may have an inner surface 91 extending circumferentially along a part of the outer surface of the earpiece housing 3 and an outer surface 92 configured to abut the inside of the ear canal of the user. The dome 9 may be formed as a plug or shell manufactured to fit snugly in the ear canal of the user, e.g., by manufacturing the dome 9 according to an impression made of the ear canal or by manufacturing the dome as a generically shaped dome made from a resilient material, e.g., a silicone-based elastomeric material. The dome 9 may be made from a plastic material with a smooth outer surface for comfort, stability, and hygienic reasons.

The example earpiece 3 shown in FIG. 8A comprises a vent mechanism 15 arranged in the earpiece housing 8, such as in the first earpiece housing part 81. The vent mechanism 15 is in the example shown in FIG. 8A arranged proximal to the receiver. The vent mechanism 15 may be an active vent mechanism. The vent mechanism 15 is configured to open and close a vent path 16 inside the earpiece housing 8. The vent path 16 can pass at least partially through the earpiece housing 8. The vent mechanism 15 can comprise any mechanical mechanism that opens and closes the vent path 16. The vent mechanism 15 can be operated electronically and/or automatically and/or manually and/or mechanically. The earpiece housing 8 has a first set of first vent apertures 14 comprising a first primary vent aperture on the proximal end of the earpiece housing 8, such as on the first earpiece housing part 81. In the example earpiece 3 shown in FIG. 8A, the first set of vent apertures comprises the sound outlet 12. The vent path 16 may extend through the earpiece housing 8, such as from a proximal end of the earpiece housing, such as through the sound outlet 12, to a distal end of the earpiece housing 8. The earpiece housing 8 may have a second set of second vent apertures 14 comprising a second primary vent aperture on the outer surface distal to the vent mechanism 15. Air may thus flow along the vent path 16, through the sound outlet 12 via the vent mechanism and through the second set of second vent apertures 14. When the vent mechanism 15 is open, the vent mechanism 15 allows air to flow through the earpiece 3 between a proximal end and a distal end of the earpiece 3. When closed, the vent mechanism 15 prevents air from flowing through the vent path 16 in the earpiece 3, e.g., between a proximal end and a distal end of the earpiece 3 and/or between a distal side and a proximal side of the vent mechanism 15. Thus, the vent mechanism 15 can prevent fluid communication when closed. This can advantageously allow for improved sound quality when a user is for example listening to music. For example, the vent mechanism can be closed so that the user can experience improved bass hearing. However, when the user desires to hear the surrounding environment, the vent mechanism 15 can be opened to avoid undesired occlusion effects. As shown in FIG. 8*b*, the receiver 4 and the microphone 5 are arranged so that the receiver axis X_R and the microphone axis X_M form a first angle $\alpha_1$, such as a first angle $\alpha_1$ to each other. The sound outlet 12 and the first earpiece housing part 81 are tilted in relation to the receiver 4, so that the outlet axis X_O is arranged at a second angle $\alpha_2$ to the receiver axis X_R. The cable outlet 11 is arranged in the second earpiece housing part 82 such that the cable outlet axis X_CO and the receiver axis X_R form a fourth angle $\alpha_4$.

Figure 9:
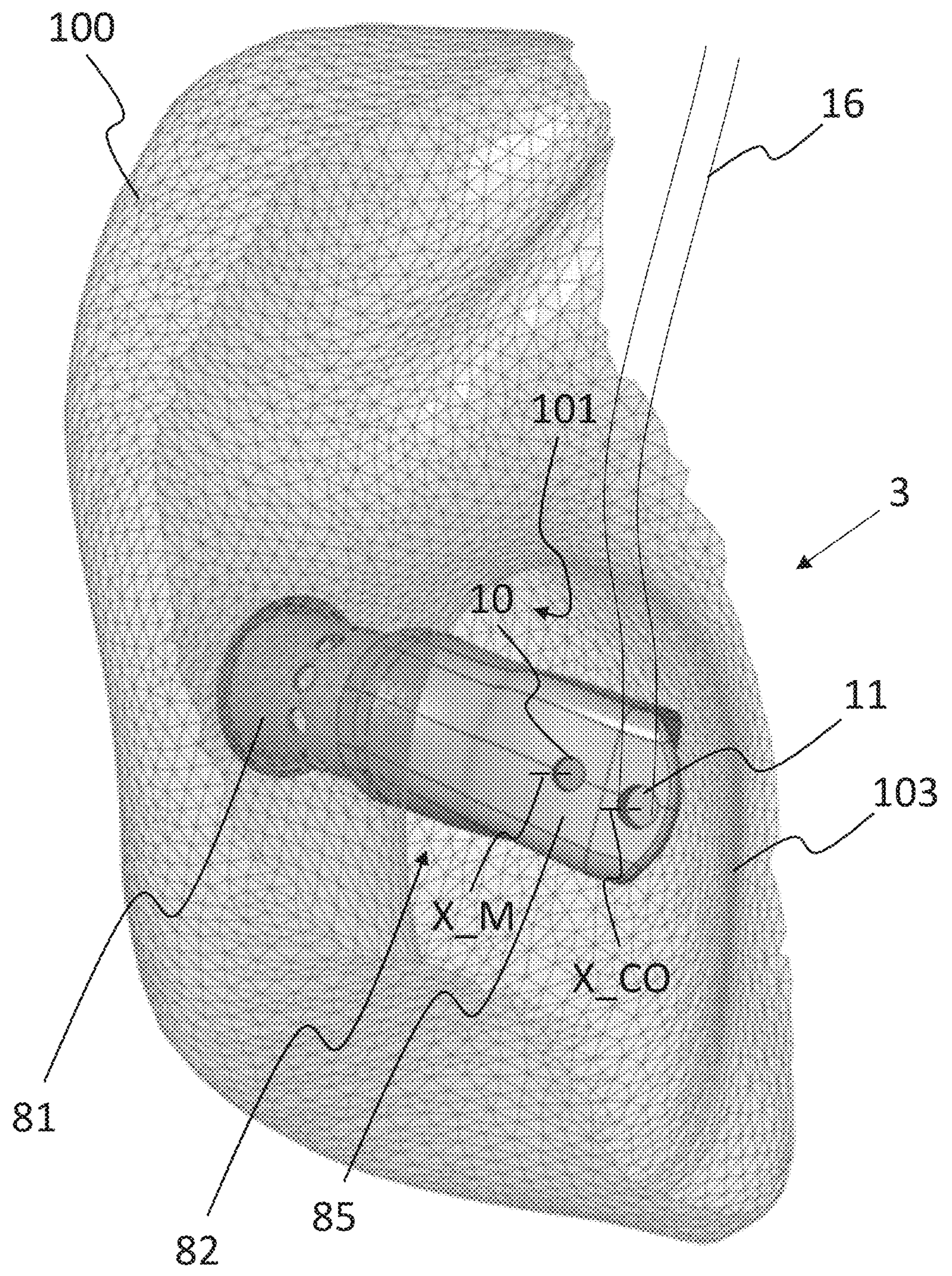

FIG. 9 shows an exemplary earpiece 3 according to the current disclosure arrange din an ear canal of a user. Unless otherwise noted, the earpiece 3 can include the same features as discussed above with respect to FIGS. 2-8. The exemplary earpiece 3 shown in FIG. 9 comprises a cable for connecting the receiver and/or the microphone comprised within the earpiece housing, such as within the second earpiece housing part 82 to a secondary housing (not shown in FIG. 9) of the hearing device. The cable 16 extends from the earpiece housing 8 through the cable outlet 11 arranged in the second earpiece housing part 82. The cable outlet 11 and/or the microphone inlet 10 is/are in the exemplary earpiece of FIG. 9 arranged on the outer surface 85 of the second earpiece housing part 82. By placing the cable outlet 11 on the outer surface of the earpiece housing 8, the length of the earpiece housing 8 in a longitudinal direction of the earpiece housing 8 can be reduced. Thereby, the comfort of wear for the user of the earpiece can be improved since the cable does not come into contact with the ear of the user. The cable outlet 11 is arranged such that the cable 16 is directed away from the outer ear of the user such as away from the tragus 103 of the ear 100 of the user. The cable outlet 10 is arranged so that the cable outlet axis X_CO has a clear line of sight out of the ear 100 of the user, such as along the external auditory canal, and is not directed towards any part of the ear 100 of the user. The microphone 5 and/or the microphone inlet 10 of the exemplary earpiece 3 shown in FIG. 9 is/are arranged to be directed away from the outer parts of the ear of the user when the earpiece is inserted into the ear of the user, such as away from the tragus 103 of the ear 100 of the user. The microphone 5 and/or the microphone inlet 10 is/are arranged so that the microphone axis X_M has a clear line of sight out of the ear 100 of the user, such as along the external auditory canal, and is not directed towards any part of the ear 100 of the user. Thereby, the comfort of wear for the user of the earpiece can be improved since the cable 16 and/or the earpiece housing 8 does not come into contact with the ear 100 of the user. Examples of an earpiece for a hearing device according to the disclosure are set out in the following items:

Item 1. An earpiece for a hearing device for insertion into an ear canal of a user and having a longitudinal axis, the earpiece comprising:

a. an earpiece housing having a distal end, a proximal end, and an outer surface connecting the distal end to the proximal end, the earpiece housing having a sound outlet at the proximal end and a microphone inlet;

b. a receiver for providing an audio output signal to an ear canal when the earpiece is inserted into the ear canal, wherein the receiver has a receiver axis being a longitudinal center axis;

c. a microphone for provision of a first microphone input signal, the microphone comprising a microphone membrane, wherein the microphone has a microphone axis forming a normal to the microphone membrane, the receiver axis and the microphone axis forming a first angle, wherein the first angle is larger than 5 degrees.

Item 2. Earpiece according to Item 1, wherein the microphone is at least partly arranged between a distal end of the receiver and a proximal end of the receiver along the receiver axis.

Item 3. Earpiece according to Item 1 or 2, wherein the first angle is in a range of 10 to 85 degrees or larger than 85 degrees.

Item 4. Earpiece according to any one of Items 1-3, wherein the earpiece housing has an outlet axis perpendicular to the sound outlet, the outlet axis being arranged at a second angle to the receiver axis of the receiver, wherein the second angle is larger than 5 degrees.

Item 5. Earpiece according to any one of Items 1-4, wherein the second angle is in a range of 8 to 75 degrees.

Item 6. Earpiece according to any one of Items 1-5, wherein the receiver comprises a receiver outlet arranged at a proximal end of the receiver, the receiver outlet having a center being offset from the receiver axis.

Item 7. Earpiece according to Item 6, wherein the earpiece comprises a sound tube for guiding sound from the receiver outlet towards the sound outlet of the earpiece, wherein the sound tube is arranged at a third angle to the receiver axis, the third angle being larger than 5 degrees.

Item 8. Earpiece according to any one of Items 1-7, the earpiece housing having a cable outlet and a microphone inlet, the cable outlet being distal to the microphone inlet.

Item 9. Earpiece according to Item 8, wherein the cable outlet has a cable axis perpendicular to the cable outlet, the cable axis and the receiver axis forming a fourth angle, the fourth angle being larger than 10 degrees.

Item 10. Earpiece according to any one of Items 8-9, wherein the earpiece comprises a cable extending from the earpiece housing and configured for connection to a secondary housing of the hearing device, the cable extending through the cable outlet for connecting the cable to the microphone and the receiver.

Item 11. Earpiece according to any one of Items 9-10, wherein the fourth angle is in the range of 45 to 90 degrees.

Item 12. Earpiece according to any one of Items 1-11, wherein the earpiece comprises a dome for securing the earpiece in the ear canal, wherein the dome extends circumferentially along the outer surface of the earpiece housing.

Item 13. Earpiece according to any one of Items 1-12, wherein the earpiece comprises a vent mechanism arranged in the earpiece housing, wherein the vent mechanism is arranged proximal to the receiver.

Item 14. Earpiece according to Item 13, wherein the vent mechanism is configured to open and close a vent path inside the earpiece housing.

Item 15. Earpiece according to any of Items 13-14, wherein the vent path has a first set of first vent apertures comprising a first primary vent aperture on the proximal end of the earpiece housing, wherein the vent path extends through the earpiece housing, and wherein the vent path has a second set of second vent apertures comprising a second primary vent aperture on the outer surface distal to the vent mechanism.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-9 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are accordingly, to be regarded in an illustrative rather than restrictive sense. The claimed invention is intended to cover all alternatives, modifications, and equivalents.

LIST OF REFERENCES

3 earpiece
4 receiver
5 microphone
6 microphone port
7 sound tube
8 earpiece housing
9 dome
10 microphone inlet
11 cable outlet
12 sound outlet
13 receiver outlet
14 vent aperture
15 vent mechanism
16 cable

41 receiver membrane
51 microphone membrane
81 proximal part of earpiece housing
82 distal part of earpiece housing
83 proximal end of the distal part of the earpiece housing
84 distal end of the distal part of the earpiece housing
85 outer surface
91 inner dome surface
92 outer dome surface
100 ear
101 ear canal
102 ear drum
X_R receiver axis
X_M microphone axis
X_O outlet axis
X_CO cable outlet
X_MP microphone port axis

The invention claimed is:

1. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide a sound output to the ear canal when the earpiece is inserted into the ear canal, wherein the receiver has a receiver axis, the receiver axis being a longitudinal axis of the receiver, and being parallel to a long-side of the receiver; and a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees;

wherein the receiver axis is parallel to a primary direction of the sound output of the receiver.

2. The earpiece according to claim 1, wherein an axis extending from a part of the microphone in a direction that is perpendicular to the receiver axis intersects the receiver axis at a location that is between a distal end of the receiver and a proximal end of the receiver.

3. The earpiece according to claim 1, wherein the first angle is anywhere from 10 degrees to 85 degrees.

4. The earpiece according to claim 1, wherein the first angle is larger than 85 degrees.

5. The earpiece according to claim 1, wherein the receiver comprises a receiver outlet at a proximal end of the receiver.

6. The earpiece according to claim 5, further comprising a sound tube for guiding sound from the receiver outlet towards the sound outlet of the earpiece, wherein at least a part of the sound tube and the receiver axis form an angle that is larger than 5 degrees.

7. The earpiece according to claim 1, the earpiece housing having a cable outlet, the cable outlet being distal to the microphone inlet.

8. The earpiece according to claim 1, further comprising a dome, wherein the dome extends circumferentially along the outer surface of the earpiece housing.

9. The earpiece according to claim 1, further comprising a vent mechanism in the earpiece housing, wherein the vent mechanism is proximal to the receiver, and wherein the vent mechanism is away from the sound outlet.

10. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide an audio output signal to the ear canal when the earpiece is inserted into the ear canal, wherein the receiver has a receiver axis, the receiver axis being a longitudinal axis of the receiver, and being parallel to a long-side of the receiver; and a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees;

wherein the earpiece housing has an outlet axis perpendicular to the sound outlet, the outlet axis forming a second angle with respect to the receiver axis of the receiver, wherein the second angle is larger than 5 degrees.

11. The earpiece according to claim 10, wherein the second angle is anywhere from 8 degrees to 75 degrees.

12. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide an audio output signal to the ear canal when the earpiece is inserted into the ear canal, wherein the receiver has a receiver axis, the receiver axis being a longitudinal axis of the receiver; and a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees;

wherein the receiver comprises a receiver outlet at a proximal end of the receiver; and wherein the receiver outlet has a center that is offset from the receiver axis.

13. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide an audio output signal to the ear canal when the earpiece is inserted into the ear canal, wherein the receiver has a receiver axis, the receiver axis being a longitudinal axis of the receiver; and a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees;

wherein the earpiece housing has a cable outlet, the cable outlet being distal to the microphone inlet; and wherein the cable outlet has a cable axis perpendicular to the cable outlet, the cable axis and the receiver axis forming an angle that is larger than 10 degrees.

14. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide an audio output signal to the ear canal when the earpiece is inserted into the ear canal, wherein the receiver has a receiver axis, the receiver axis being a longitudinal axis of the receiver; and a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees;

wherein the earpiece housing has a cable outlet, the cable outlet being distal to the microphone inlet; and wherein the earpiece further comprises a cable extending from the earpiece housing and configured for connection to a secondary housing of a hearing device, the cable extending through the cable outlet and connects to the microphone and the receiver.

15. The earpiece according to claim 13, wherein the angle formed by the cable axis and the receiver axis is anywhere from 45 degrees to 90 degrees.

16. An earpiece for insertion into an ear canal of a user, comprising:

an earpiece housing having a distal end, a proximal end, and an outer surface extending between the distal end and the proximal end, the earpiece housing having a sound outlet at the proximal end and a microphone inlet;

a receiver configured to provide an audio output signal to the ear canal when the earpiece is inserted into the ear canal, wherein the receiver has a receiver axis, the receiver axis being a longitudinal axis of the receiver;

a microphone configured to provide a first microphone input signal, the microphone comprising a microphone membrane, wherein the microphone has a microphone axis that is perpendicular to the microphone membrane, the receiver axis and the microphone axis forming a first angle that is larger than 5 degrees; and a vent mechanism in the earpiece housing, wherein the vent mechanism is proximal to the receiver;

wherein the vent mechanism is configured to open and close a vent path that is at least partly inside the earpiece housing.

17. The earpiece according to claim 16, wherein the vent path has a first aperture at the proximal end of the earpiece housing, and wherein the vent path has a second aperture on the outer surface of the earpiece housing, the second aperture being distal to the vent mechanism.

* * * * *